(12) United States Patent
Oberman et al.

(10) Patent No.: US 7,659,893 B1
(45) Date of Patent: Feb. 9, 2010

(54) METHOD AND APPARATUS TO ENSURE CONSISTENCY OF DEPTH VALUES COMPUTED IN DIFFERENT SECTIONS OF A GRAPHICS PROCESSOR

(75) Inventors: Stuart F. Oberman, Sunnyvale, CA (US); Steven E. Molnar, Chapel Hill, NC (US); Alexander L. Minkin, Los Altos, CA (US); Peter B. Holmqvist, Cary, NC (US)

(73) Assignee: NVIDIA Corporation, Santa Clara, CA (US)

( * ) Notice: Subject to any disclaimer, the term of this patent is extended or adjusted under 35 U.S.C. 154(b) by 528 days.

(21) Appl. No.: 11/538,002

(22) Filed: Oct. 2, 2006

(51) Int. Cl.
*G06T 15/40* (2006.01)
(52) U.S. Cl. .................. 345/422; 345/421; 345/546
(58) Field of Classification Search .............. 345/422
See application file for complete search history.

(56) References Cited

U.S. PATENT DOCUMENTS

| 6,490,607 | B1 * | 12/2002 | Oberman | 708/620 |
| 6,580,427 | B1 * | 6/2003 | Orenstein et al. | 345/422 |
| 2006/0033735 | A1 * | 2/2006 | Seiler et al. | 345/421 |

* cited by examiner

*Primary Examiner*—Xiao M Wu
*Assistant Examiner*—Scott E Sonners
(74) *Attorney, Agent, or Firm*—Townsend and Townsend and Crew LLP

(57) ABSTRACT

At least two different processing sections in a graphics processors compute Z coordinates for a sample location from a compressed Z representation. The processors are designed to ensure that Z coordinates computed in any unit in the processor are identical. In one embodiment, the respective arithmetic circuits included in each processing section that computes Z coordinates are "bit-identical," meaning that, for any input planar Z representation and coordinates, the output Z coordinates produced by the circuits are identical to each other.

19 Claims, 7 Drawing Sheets

METHOD AND APPARATUS TO ENSURE CONSISTENCY OF DEPTH VALUES COMPUTED IN DIFFERENT SECTIONS OF A GRAPHICS PROCESSOR

CROSS-REFERENCES TO RELATED APPLICATIONS

The present disclosure is related to commonly assigned U.S. patent application Ser. No. 10/878,460, filed Jun. 28, 2004, titled "Planar Z Representation for Z Compression"; now U.S. Pat. No. 7,382,368, and to commonly assigned co pending U.S. patent application Ser. No. 10/970,101, filed Oct. 20, 2004, titled "Multipurpose Arithmetic Functional Unit." The respective disclosures of these applications are incorporated herein by reference for all purposes.

BACKGROUND OF THE INVENTION

The present invention relates in general to graphics processing devices and methods, and in particular to a method and apparatus to ensure consistency of depth values computed in different sections of a graphics processor.

Graphics processors are used to render images in many computer systems. In a typical rendering process, the graphics processor receives primitives (e.g., points, lines, and/or triangles) representing objects in a scene. In accordance with instructions provided by an application program, the graphics processor transforms each primitive to a viewing space, then determines which pixels (or samples, where there may be one or more samples per pixel) of the image are covered by the primitive. For each pixel that is covered, the graphics processor computes a color and depth (or z) value for the fragment of the primitive that covers (or partially covers) the pixel. The color and depth values computed for each fragment are provided to a raster operations (ROP) unit, which builds up the rendered image by storing per-pixel (or per-sample) color and depth information in a frame buffer. As the ROP unit receives new data for newly rendered fragments, it compares each new depth value for a pixel to a previous depth value stored in the frame buffer for that pixel. Based on the comparison, the ROP unit determines whether to write the new data to the frame buffer. If new data is to be written, the ROP unit updates the depth and color values in the frame buffer based on the new data.

In the course of generating an image, the ROP unit typically generates a large number of requests to transfer data to and from the frame buffer. Images may include a large number of fragments, and each time the ROP unit receives new fragment data, it reads one or more old pixels (at least the Z information) from the frame buffer. For each pixel that is to be changed, the ROP unit also reads the current color from the frame buffer. Modified colors and Z values are then written back to the frame buffer. In some graphics systems, bandwidth between the ROP unit and the frame buffer can become a bottleneck, limiting system performance.

In some graphics processors, demand for bandwidth between the ROP unit and the frame buffer is reduced by storing Z data in the frame buffer in a compressed form. The ROP unit compresses the Z data prior to writing it to the frame buffer and decompresses the Z data after reading it from the frame buffer in order to perform Z comparisons.

A related patent application, above-referenced application Ser. No. 10/878,460, describes a technique for compressing Z data by storing a planar representation of the Z coordinate for a fragment that covers all or part of a "tile" (a region of pixels, e.g., 16×16), rather than a separate Z value for each pixel in the tile. In one embodiment described therein, Z is represented using "tile-relative" coordinates, where the tile-relative coordinates (x, y) for a sample location define that location relative to a tile center $(X_c, Y_c)$ in screen space. In one example, the planar Z representation for a fragment is an ordered triple of coefficients $(A_t, B_t, C_t)$ such that:

$$Z = A_t * x + B_t * y + C_t \quad \text{(Eq. 1)}$$

for any sample location (x, y) within the tile, where coordinates (x, y) are defined relative to the center of the tile. For each tile, a frame buffer stores one or more triples $(A_t, B_t, C_t)$, depending on how many fragments at least partially cover the tile. Also stored is coverage information indicating which portion of the tile is covered by which triples $(A_t, B_t, C_t)$. In one example described in application Ser. No. 10/878,460, tiles are 16×16 pixels, and up to six planar Z representations (representing fragments of up to six different surfaces that are at least partially visible in the tile) can be stored per tile. If more than six Z surfaces are needed for a particular tile, data for that tile is stored in uncompressed form. Using this technique, compression factors of 8:1 can be achieved for tiles that are covered by visible fragments of one or two Z surfaces. In some cases, the same amount of frame buffer space is allocated per tile regardless of whether the data for that tile is compressed or not. Where Z information for a tile is stored in compressed form, read and write operations for the tile require less bandwidth than for tiles where uncompressed Z data is stored.

BRIEF SUMMARY OF THE INVENTION

In graphics processors described in above-referenced application Ser. No. 10/878,460, computations and comparisons of Z coordinates are performed by one unit (e.g., the ROP unit). In some graphics processors, it is desirable to enable multiple different units to compute and/or compare Z coordinates. Where Z coordinates are computed in multiple different units, errors or inconsistencies in the rendered image may result if different units do not produce the same Z coordinate from the same set of inputs (e.g., the same plane equation coefficients and (x, y) coordinates).

Embodiments of the present invention provide graphics processors in which at least two different units compute Z coordinates from a planar Z representation. The processors are designed to ensure that Z coordinates computed in any unit in the processor are identical. For instance, in some embodiments, Z coordinates may be computed by one or more of a processing core that executes a pixel shader, a texture unit, a ROP unit, or a frame buffer interface. The respective arithmetic circuits used to compute Z in each of these units are advantageously "bit-identical," meaning that, for any input planar Z representation and coordinates, the output Z coordinates produced by the circuits are identical to each other.

According to one aspect of the present invention, a graphics processor includes a plane equation module, a first processing section subsequent to the plane equation module, and a second processing section also subsequent to the plane equation module. The plane equation module is configured to receive vertex information for a number of primitives, each of which covers one or more of a number of tiles, and to generate a compressed Z representation (e.g., a planar Z representation) corresponding to each primitive. Each compressed Z representation is associated with at least one tile covered by the primitive. The first processing section includes a first arithmetic circuit configured to compute a first Z coordinate for a sample location within a first tile from a first compressed Z representation associated with the first tile. The second processing section includes a second arithmetic circuit configured to compute a second Z coordinate for a sample location within the first tile from a second compressed Z representation associated with the first tile. The first arithmetic circuit and the second arithmetic circuit are bit-identical to each other.

As used herein, the first and second processing sections may be any two processing sections of a graphics processor that each include a bit-identical arithmetic circuit used to compute Z. For instance, in one embodiment, the first processing section is a processing core configured to execute a pixel shader, while the second processing section is a raster operations unit. In another embodiment, the first processing section is a raster operations unit and the second processing section is a frame buffer interface. In a further another embodiment, the first processing section is a processing core configured to execute a pixel shader and the second processing section is a texture processing unit. In a still further embodiment, the first processing section is a texture processing unit and the second processing section is a frame buffer interface.

In some embodiments, the graphics processor also includes a third processing section subsequent to the plane equation module. The third processing section is configured to receive the first Z coordinate from the first processing section and the second Z coordinate from the second processing section and is further configured to compare the first Z coordinate and the second Z coordinate. Thus, for instance, the third processing section might be a texture pipeline that receives a first Z coordinate that was computed by a processing core executing a fragment shader program and a second Z coordinate that was computed by either a raster operations unit or a frame buffer interface. As long as the first and second Z coordinates are computed using bit-identical arithmetic circuits, the comparison by the texture pipeline will have the same result, regardless of which processing section computed the Z coordinates.

According to another aspect of the present invention, a method of rendering an image in a graphics processor includes generating a first compressed Z representation (e.g., a planar Z representation) corresponding to a first one of a number of primitives. The first compressed Z representation is associated with a tile covered by the first primitive. A first Z coordinate for a sample location within the tile is computed from the first compressed Z representation using a first arithmetic circuit in a first processing section of the graphics processor. A second compressed Z representation corresponding to a second one of the primitives is also generated. The second compressed Z representation is also associated with the tile. A second Z coordinate for the sample location within the tile is computed from the second compressed Z representation using a second arithmetic circuit in a second processing section of the graphics processor. The second arithmetic circuit is bit-identical to the first arithmetic circuit. The first Z coordinate and the second Z coordinate are compared, and a rendering operation that depends at least in part on the result of comparing the first Z coordinate to the second Z coordinate is performed.

The following detailed description together with the accompanying drawings will provide a better understanding of the nature and advantages of the present invention.

DETAILED DESCRIPTION OF THE INVENTION

Embodiments of the present invention provide graphics processors in which at least two different units compute Z coordinates from a planar Z representation. The processors are designed to ensure that Z coordinates computed in any unit in the processor are identical. For instance, in some embodiments, Z coordinates may be computed by one or more of a processing core that executes a pixel shader, a ROP unit, or a frame buffer interface. The respective arithmetic circuits used to compute Z in each of these units are advantageously "bit-identical," meaning that, for any input planar Z representation and coordinates, the output Z coordinates produced by the circuits are identical to each other.

System Overview

Figure 1:
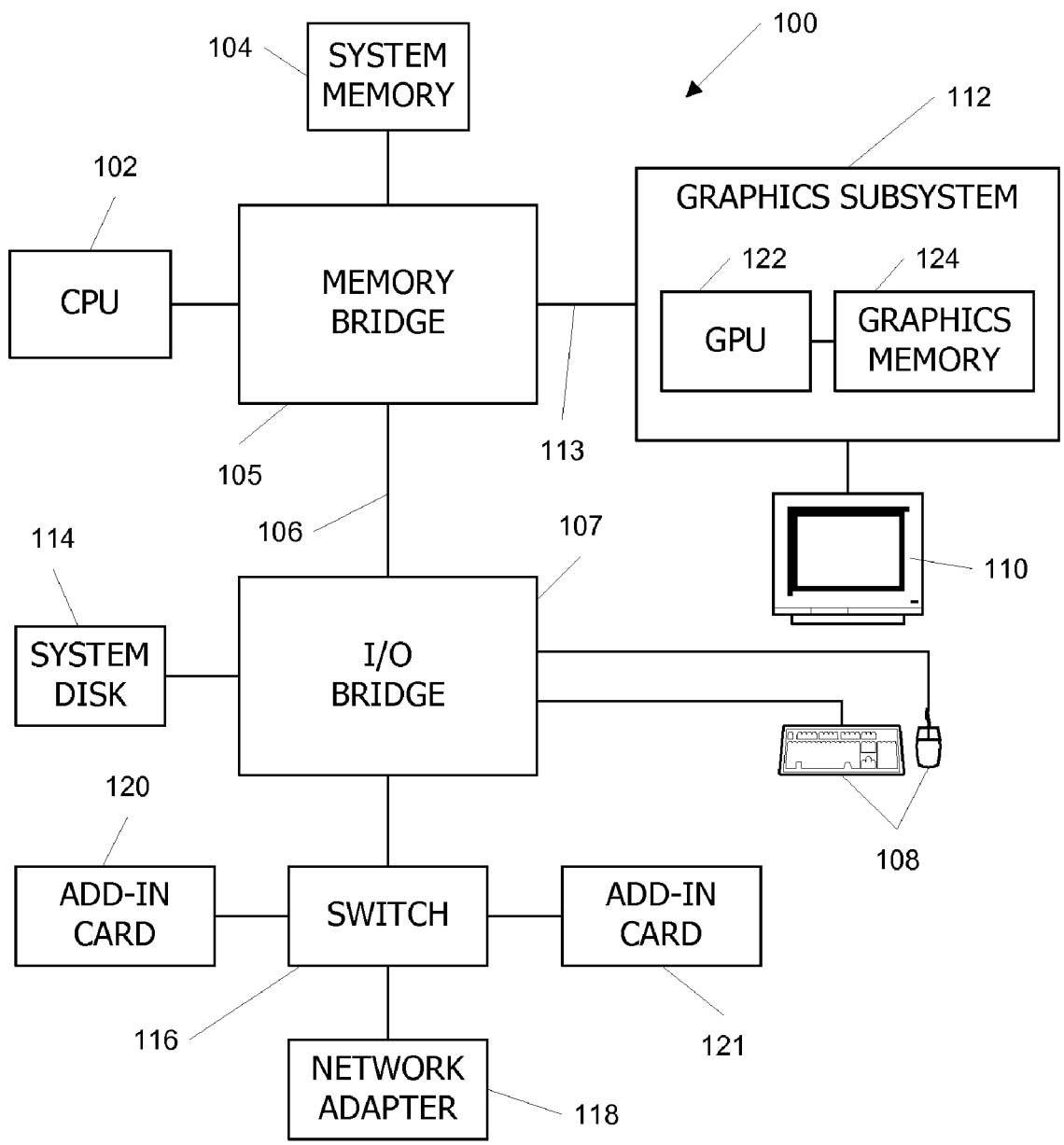
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may include a rendering pipeline that generates pixel data from 2-D or 3-D scene data provided by various programs executing on CPU 102. GPU 122 may also store pixel data received via memory bridge 105 to graphics memory 124 with or without further processing. GPU 122 may also include a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, hand-held devices such as mobile phones or personal digital assistants, and so on.

Rendering Pipeline and Depth Coordinates

In some embodiments, the present invention has applications in graphics processors in which units at different places in a rendering pipeline each compute Z information from a planar representation. For purposes of understanding the present invention, an example of a rendering pipeline that may be implemented in GPU 122 will now be described. It is to be understood that embodiments of the present invention may also be employed in other rendering pipelines.

Figure 2:
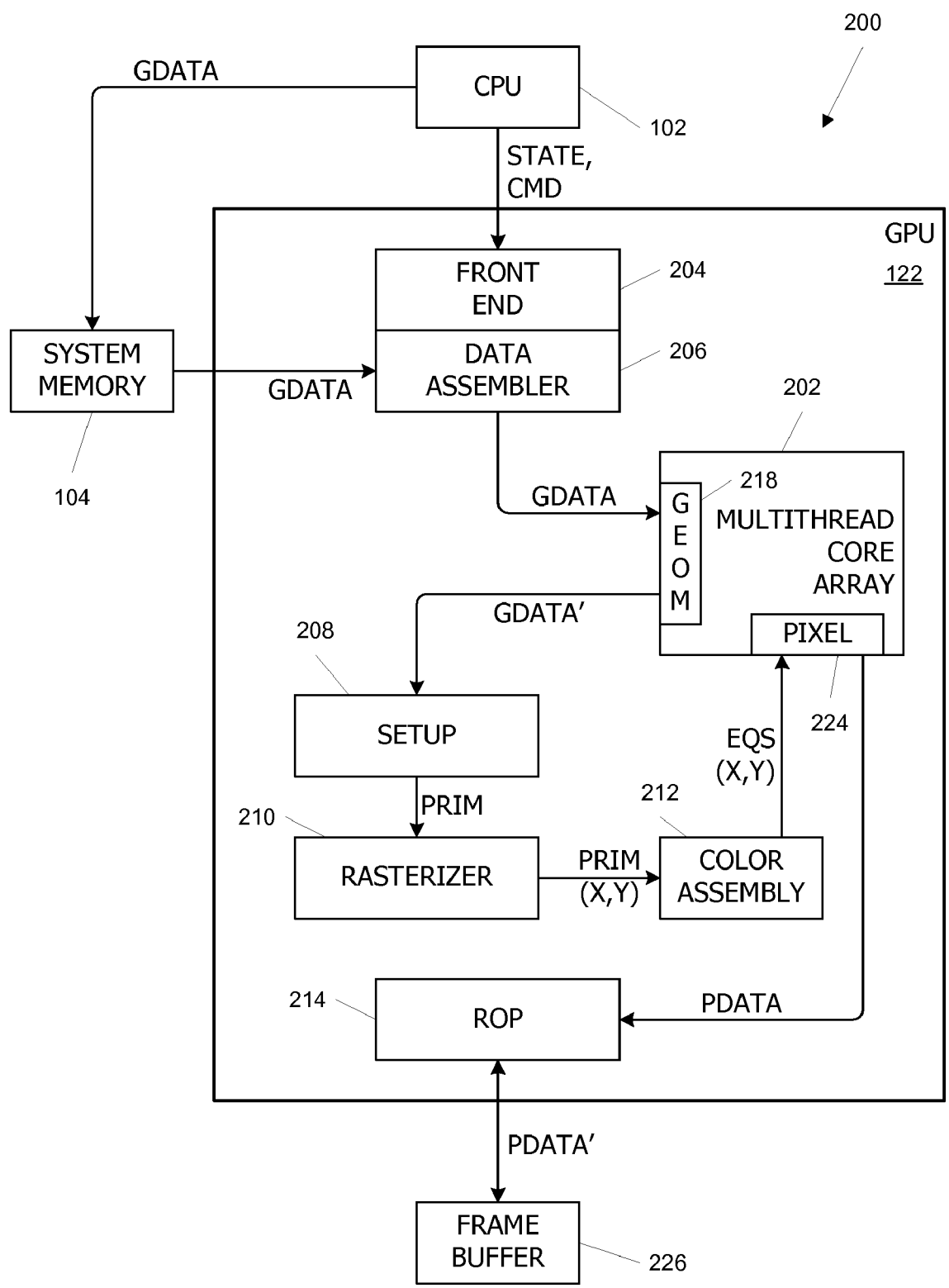
FIG. 2 is a block diagram of a rendering pipeline that can be implemented in a graphics processor according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202.

In addition to multithreaded core array 202, rendering pipeline 200 includes a front end 204 and data assembler 206, a setup module 208, a rasterizer 210, a color assembly module 212, and a raster operations (ROP) unit 214, each of which can be implemented using conventional integrated circuit technologies or other technologies. ROP unit 214 communicates with a frame buffer 226, which may be located, e.g., in graphics memory 124 or system memory 104 of FIG. 1.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. A detailed description of such programs is omitted as not being critical to understanding the present invention.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside ("covered by") or outside the primitive.

Setup module 208 provides edge equations for each primitive (PRIM) to rasterizer 210. Rasterizer 210, which may be of generally conventional design, determines which (if any) pixels are covered by the primitive, e.g., using conventional scan-conversion algorithms. As used herein, a "pixel" refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within a pixel (e.g., using conventional supersampling or multisampling techniques), and in some embodiments, supersampling or multisampling is handled within the pixel shader. It is to be understood that "pixel" as used herein could also refer to a single sample within a supersampled or multisampled pixel.

In accordance with one embodiment of the present invention, rasterizer 210 also generates a planar representation of the Z (depth) coordinate for each fragment of a primitive (also referred to herein as a "surface") that at least partially covers a tile (i.e., a region of pixels), as described in above-referenced application Ser. No. 10/878,460. For example, in one embodiment:

$$Z = A*X + B*Y + C, \quad \text{(Eq. 2)}$$

where X and Y are screen-space coordinates of a pixel and (A, B, C are floating-point coefficients determined from the Z coordinates of the vertices of the primitive using conventional techniques.

In some embodiments, it is preferable to express the Z plane equation using "tile-relative" coordinates. A point with screen coordinates $(X_c, Y_c)$ e.g., at the center of the tile, is defined as a reference point, and other points in the tile are assigned tile-relative coordinates (x, y) such that $x = X - X_c$ and $y = Y - Y_c$. Z can be expressed in tile-relative coordinates (x, y) as:

$$Z = A*(x+X_c) + B*(y+Y_c) + C = A*x + B*y + C_t, \quad \text{(Eq. 3)}$$

where:

$$C_t = C + A*X_c + B*Y_c. \quad \text{(Eq. 4)}$$

Using tile-relative coordinates rather than screen-space coordinates allows the plane equation to be computed to a desired precision while retaining a smaller number of bits. More specifically, to the extent that the tile is smaller than the screen, the range in (X, Y) space over which interpolation is performed is reduced; consequently, fewer bits for coefficients A and B are needed to interpolate within the range of a tile than over the entire screen. Thus, in one embodiment, Z is represented by coefficients $A_t$, $B_t$, and $C_t$, where $C_t$ is given by Eq. 4 above and $A_t$ and $B_t$ are created from A and B by dropping zero or more least significant bits (LSBs) of the mantissas. Dropping LSBs results in lossy compression, which is acceptable as long as the resulting resolution of Z coordinates computed using Eq. 3 is adequate for the rendering operations to be performed.

The coefficients A, B, and C (or $A_t$, $B_t$ and $C_t$) are advantageously stored in frame buffer 226 on a per-tile basis as described in application Ser. No. 10/878,460. As described therein, where multiple surfaces each cover portions of a tile, a set of coefficients for each such surface may be stored in the portion of frame buffer 226 allocated to that tile, together with coverage information indicating which pixels within the tile are covered by each surface. An implementation of a rasterizer 210 that generates a planar Z representation is described in application Ser. No. 10/878,460; other implementations may be substituted.

Referring again to FIG. 2, after determining which pixels are covered by a primitive, rasterizer 210 provides the vertices, attributes, and planar Z representation of the primitive (PRIM), together with a list of screen coordinates (X, Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space. In some embodiments, color assembly module 212 (rather than rasterizer 210) also generates the planar Z representation.

For each primitive that covers at least one pixel, color assembly module 212 and rasterizer 210 provide the attribute equations (EQS), including the planar Z representation, and a list of screen coordinates (X, Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to state information provided by front end 204. Pixel shader programs can be used to implement a variety of visual effects, including lighting and shading effects, reflections, texture blending, procedural texture generation, and so on. As with vertex shader programs and geometry shader programs, rendering applications can specify the pixel shader program to be used for any given set of pixels. Numerous examples of pixel shader algorithms and programs are known in the art and a detailed description is omitted as not being critical to understanding the present invention.

Core array 202 in one embodiment includes one or more cores adapted to execute instructions for such programs as well as a dedicated texture pipeline adapted to perform texture filtering operations in response to instructions included in the pixel shader program(s). These aspects of core array 202 are described below with reference to FIG. 3A.

It should be noted that some pixel shader algorithms require a Z coordinate for a pixel (or sample); where a planar Z representation is used, the processing engines of multithreaded core array compute the Z coordinate from the planar representation. If a Z coordinate is not required to execute the pixel shader algorithm, multithreaded core array 302 advantageously does not compute a Z coordinate. Similarly, in some instances, texture filtering may also include computing Z coordinates.

Once processing for a pixel or group of pixels is complete, pixel module 224 provides the fragment data (PDATA) to ROP unit 214. The fragment data advantageously includes the Z information, which may be provided using either a planar representation or per-pixel Z values. ROP unit 214, which may be of generally conventional design, integrates new fragment data (referred to herein as "source" data) received from pixel module 224 with data previously stored in frame buffer 226 (referred to herein as "destination" data). In some embodiments, ROP unit 214 can mask source fragment data, overwrite destination fragment data with source fragment data, and/or blend source data with destination data.

ROP unit 214 advantageously performs hidden surface removal using a Z test. The Z test in one embodiment entails reading destination Z information from frame buffer 226 and comparing the destination Z value to a source Z value to determine whether the new pixel corresponds to a surface that is hidden behind the surface represented by the existing one.

Where Z information is provided to ROP unit 214 in a planar representation, ROP unit 214 may need to compute Z coordinates for the source and the destination. In some embodiments, ROP unit 214 can skip per-pixel Z computation in at least some instances. For instance, as described in above-referenced application Ser. No. 10/878,460, the Z test may include a preliminary "bounds" test applied at a tile level. Using the planar representations (e.g., $A_t$, $B_t$, $C_t$ coefficients) of the source and destination tiles, a maximum Z and a minimum Z are computed for the source tile and the destination tile. Comparing the maximum Z for the source tile to the minimum Z for the destination tile and vice versa indicates whether one of the two surfaces completely hides the other (at least within that tile); if so, no further Z testing is necessary. Where the bounds test indicates that one surface only partially hides the other, per-pixel testing is done, in which case ROP unit 214 may compute a Z coordinate for each pixel in the source and destination tiles.

In some embodiments, other tests such as alpha tests and/or stencil tests can also be used to determine the contribution (if any) of each new fragment to the rendered image.

After ROP unit 214 has finished its operations, it writes pixel data PDATA' corresponding to the appropriate combination of source and destination data to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in tiles (e.g., 16×16 pixels) to determine which, if any, tiles each primitive covers (or partially covers), followed by a "fine" rasterizer that determines coverage for individual pixels within any tile that the coarse rasterizer identifies as being at least partially covered. Either the coarse rasterizer or the fine rasterizer may compute a screen-space or tile-specific planar Z. In one such embodiment, the fine rasterizer is contained within pixel module 224. In another embodiment, some operations conventionally performed by a ROP unit may be performed within pixel module 224 before the pixel data is forwarded to ROP unit 214.

Figure 3A:
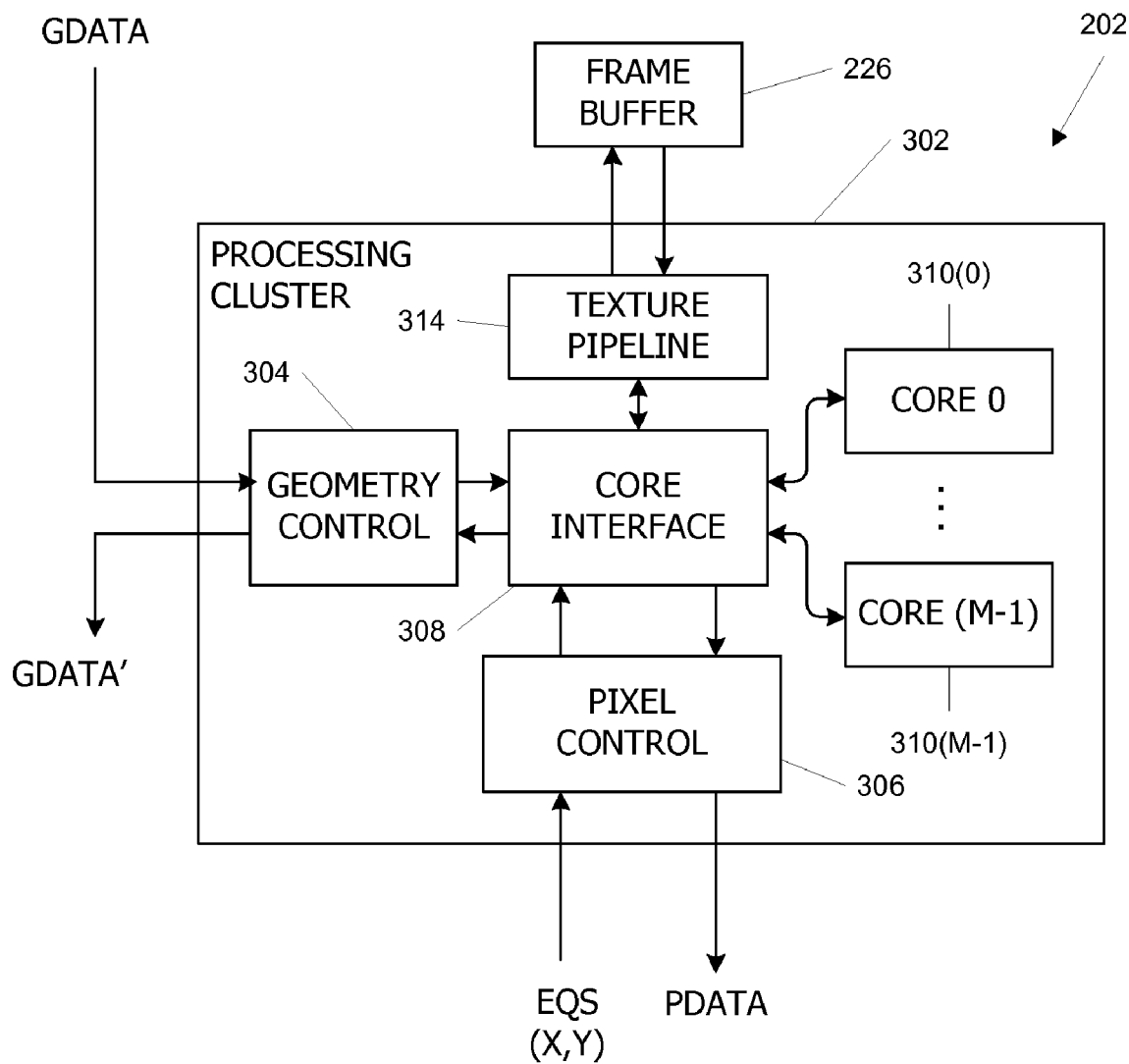
FIGS. 3A and 3B are block diagrams of elements of the rendering pipeline of FIG. 2 according to an embodiment of the present invention, with FIG. 3A illustrating a multithreaded core array and FIG. 3B illustrating a Z operations unit.

FIG. 3A is a block diagram of multithreaded core array 202 according to an embodiment of the present invention. In this embodiment, multithreaded core array 202 includes a processing cluster 302. Processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include processing engines of multithreaded core array 202. Herein, multiple instances of like objects are denoted with reference numbers identifying the object and parenthetical numbers identifying the instance where needed. Any number M (e.g., 1, 2, 4 or any other number) of cores 310 may be controlled by a single core interface 308. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and/or pixel threads. The particular implementation of cores 310 is not critical to the present invention, and a detailed description has been omitted.

Core interface 308 also controls a texture pipeline 314 that is shared among cores 310. Texture pipeline 314 advantageously includes logic circuits configured to receive texture requests, to fetch texture data referenced in the request from memory (e.g., frame buffer 226 of FIG. 2 or graphics memory 124 or system memory 104 of FIG. 1), and to filter the texture data according to various algorithms. Conventional filtering algorithms including bilinear and trilinear filtering may be used. When a core 310 encounters a texture instruction in one of its threads, it makes a texture request to texture pipeline 314 via core interface 308. The texture request may include a texture identifier, texture coordinates, and information about the fragment being processed, such as a Z coordinate computed by core 310. Texture pipeline 314 processes the texture request and returns the result to the core 310 via core interface 308. It should be noted that in some instances, texture pipeline 314 may perform various tests based on comparisons between the Z coordinate included in the texture request and one or more Z coordinates included in the texture data and may also compute Z coordinates, e.g., when compositing a current fragment with a previously rendered fragment.

It will be appreciated that the multithreaded core array described herein is illustrative and that variations and modifications are possible. Any number (e.g., 1, 4, 8, or any other number) of processing clusters may be provided, and each processing cluster may include any number (e.g., 1, 2, 4, or any other number) of cores. Various algorithms may be used to distribute work to the cores (and/or to the processing clusters in embodiments with multiple processing clusters). In some embodiments, shaders of certain types (e.g., vertex shaders, geometry shaders and/or pixel shaders) may be restricted to executing in certain processing clusters or in certain cores; such design choices may be driven by considerations of hardware size and complexity versus performance, as is known in the art, and are not critical to the present invention. A shared texture pipeline is also not critical to the present invention; in some embodiments, each core might have its own texture pipeline or might leverage general-purpose functional units to perform texture operations.

Figure 3B:
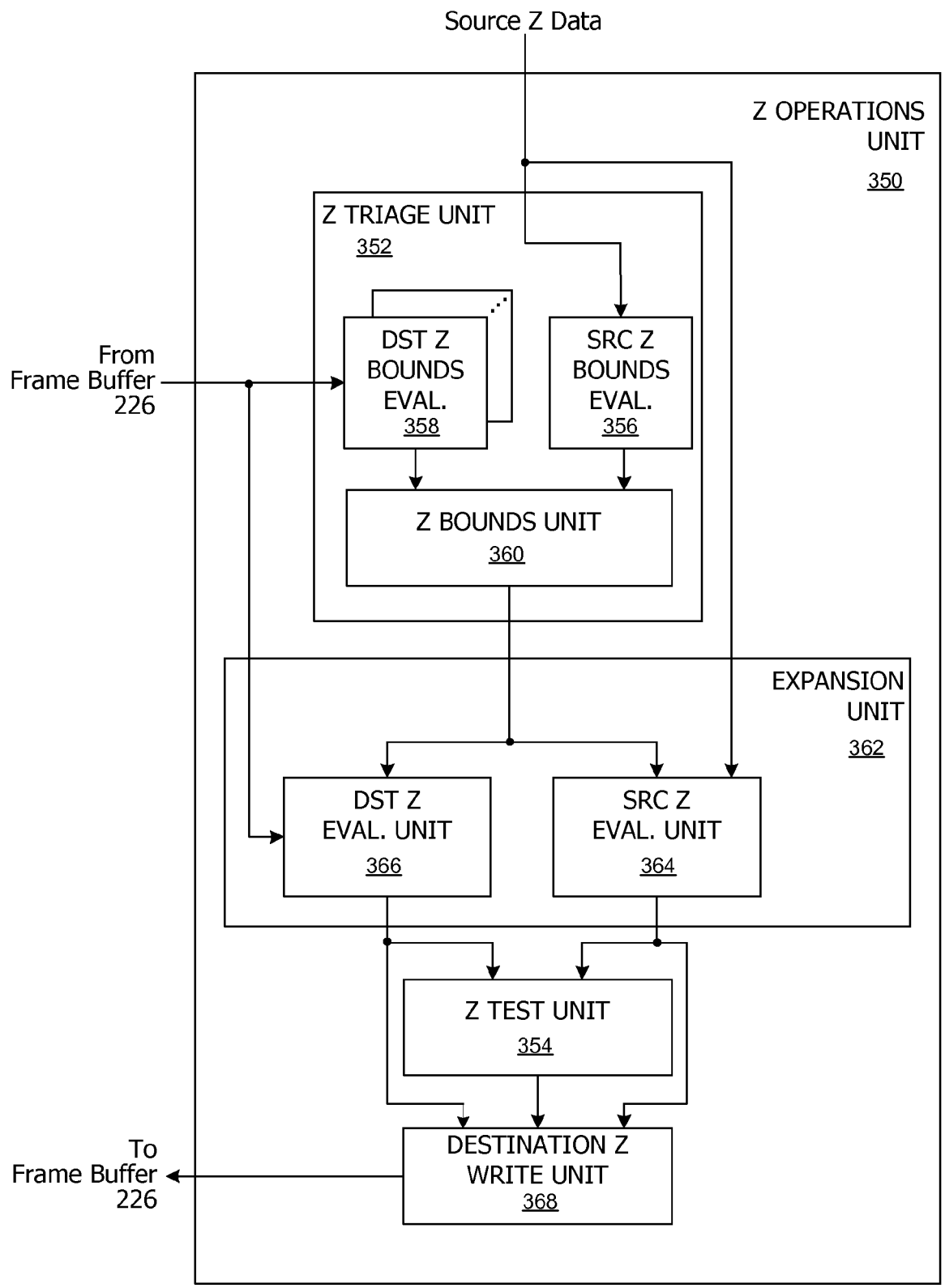

FIG. 3B is a block diagram of a Z operations unit 350 that can be implemented in a ROP unit 214 according to an embodiment of the present invention. When ROP unit 214 receives fragment data for a tile from core 310, ROP unit 214 reads Z data for the tile from frame buffer 226. In some instances, per-pixel (or per-sample) Z coordinates are read if the Z data is stored in uncompressed form, and compressed Z data (one or more planar Z representations) for the tile is read if the Z data is stored in compressed form.

A Z triage unit 352 within Z operations unit 350 receives source (src) Z data, e.g., tile-specific coefficients and coverage information from core 310. Z triage unit 352 also receives destination (dst) Z data from frame buffer 226. The destination Z data may be compressed or uncompressed. If the Z data is compressed, Z triage unit 352 performs a trivial Z test based on the minimum and maximum Z values for the source Z data and the destination Z data without decompressing the Z data. The result of the trivial Z test may be used to reject the source data, accept the source data, or determine that Z values for each pixel (or sample) need to be compared in a Z test unit 354.

The source Z data is provided to a source Z bounds evaluator 356, which determines a minimum source Z value ($Z_{Smin}$) and a maximum source Z value ($Z_{Smax}$) For instance, source Z bounds evaluator 536 may determine the minimum and maximum source Z values as:

$$Z_{Smin} = C_t - |A_t|*DX/2 - |B_t|*DY/2; \quad \text{(Eq. 5a)}$$

and $$Z_{Smax} = C_t + |A_t|*DX/2 + |B_t|*DY/2, \quad \text{(Eq. 5b)}$$

where DX is the screen-space width of the tile and DY is the screen-space height of the tile. (It should be noted that DX and DY might or might not be equal).

The destination Z data is provided to a destination Z bounds evaluator 358, which determines a minimum destination Z value ($Z_{Dmin}$) and a maximum destination Z value $Z_{Dmax}$. The computation advantageously uses equations similar to Eqs. 5a and 5b, except that the coefficients $A_t$, $B_t$, $C_t$ applicable to the destination tile rather than the source tile are used.

A Z bounds unit 360 receives the minimum and maximum source Z values from source Z bounds evaluator 356 and the minimum and maximum destination Z values from destination Z bounds evaluator 358. Z bounds unit 525 performs a trivial Z test by comparing the maximum and minimum source Z values to the maximum and minimum destination Z values. The test may be performed in one of a number of modes, e.g., "always," "never," "less than," "greater than," and the like; the mode can be specified by the application programming interface (API). The trivial Z test result indicates whether the source data should be rejected in its entirety, the source data should be accepted in its entirety, or further per-pixel testing is needed.

For example, when a "less than" Z test is specified, if the maximum source Z value is less than the minimum destination Z value, the trivial Z test result indicates that the source data should be accepted; if the minimum source Z value is greater than the maximum destination Z value, the trivial Z test result indicates that the source data should be rejected. If the source Z interval (bounded by the minimum and maximum source Z values) includes at least one Z value that overlaps with the destination Z interval (bounded by the minimum and maximum destination Z values), the trivial Z test result indicates that Z values for each pixel (or sample) need to be compared.

When the "always" Z test is specified the trivial Z test result always indicates that the source data should be accepted. When the "never" Z test is specified, the trivial Z test result indicates that the source data should be rejected. In these instances, Z triage unit 352 may disable source Z bounds evaluator 356 and destination Z bounds evaluator 358.

It should be noted that the trivial Z test result is determined without decompressing either the source Z data or the destination Z data. Further, the trivial Z test result is computed for an entire tile, so fragment data for several pixels may be trivially accepted or rejected without decompressing either the source or destination Z data.

Z bounds unit 360 provides the trivial Z test result to an expansion unit 362, which also receives the source and destination Z data. If the trivial Z test result indicates that per-pixel testing is needed, expansion unit 362 performs a per pixel "expansion" of the Z data to produce a Z coordinate for each pixel. If the trivial Z test result indicated the source Z data should be accepted or rejected, expansion unit 362 may provide appropriate control signals to Z test unit 354 but does not need to expand the Z data.

Expansion unit 362 includes a source Z evaluation unit 364 and a destination Z evaluation unit 366. Source Z evaluation unit 364 computes a Z coordinate (or multiple Z coordinates) for a pixel using the source Z data, which may be in the form of a tile specific plane equation. Destination Z evaluation unit 366 computes a Z coordinate (or multiple Z coordinates) for a pixel using the destination Z data, which may also be in the form of a tile specific plane equation. The source and destination Z coordinates are provided to Z test unit 354.

Z test unit 354 determines whether an update is needed based on information received from Z triage unit 352 and/or expansion unit 362. If an update is needed, Z test unit 354 loads Z data to be written to frame buffer 226 into a destination Z write unit 368. In one embodiment, if the trivial Z test result indicates that the source data should be accepted, Z test unit 550 loads only the compressed source data (including coverage information if the compressed source data covers only part of the tile). If the trivial Z test result indicates that per-pixel Z values for the source and destination Z coordinates need to be computed, Z test unit 550 compares each source Z value from source Z evaluation unit 364 to a corresponding destination Z value from destination Z evaluation unit 366 and determines, for each pixel, whether the source Z or the destination Z value should be used. Z test unit 550 generates coverage information indicating which value was determined in each case and provides this information to Z write unit 368. In some embodiments, Z test unit 550 also generates signals that are used by other elements (not explicitly shown) in ROP unit 214 to perform updates to color information and/or other per-pixel information.

Z write unit 368 formats the Z data for writing into frame buffer 226. In some embodiments, Z data for each tile can be stored in either compressed or uncompressed format, regardless of how data for other tiles is stored. For instance, in one embodiment, compressed Z data can be stored for a tile as long as the number of planar Z representations needed to represent all surfaces that at least partially cover that tile does not exceed some maximum (e.g., 2, 4, 6 or some other number); if the number of Z planes needed, exceeds the maximum, then uncompressed Z data is stored for that tile. Z write unit 368 determines whether to store the data in compressed or uncompressed form, formats the data accordingly, updates a compression tag indicating whether the data is compressed or not, and generates a Z write request that is transmitted to frame buffer 226 to update the Z information.

It will be appreciated that the Z operations unit described herein is illustrative and that variations and modifications are possible. Examples of arithmetic circuits that can be used to implement source Z evaluation unit 364 and/or destination Z evaluation unit 366 are described below. Further features and operations that can be included in a Z operations unit are described in above-referenced application Ser. No. 10/878,460.

Computing and Comparing Depth Coordinates

Figure 4:
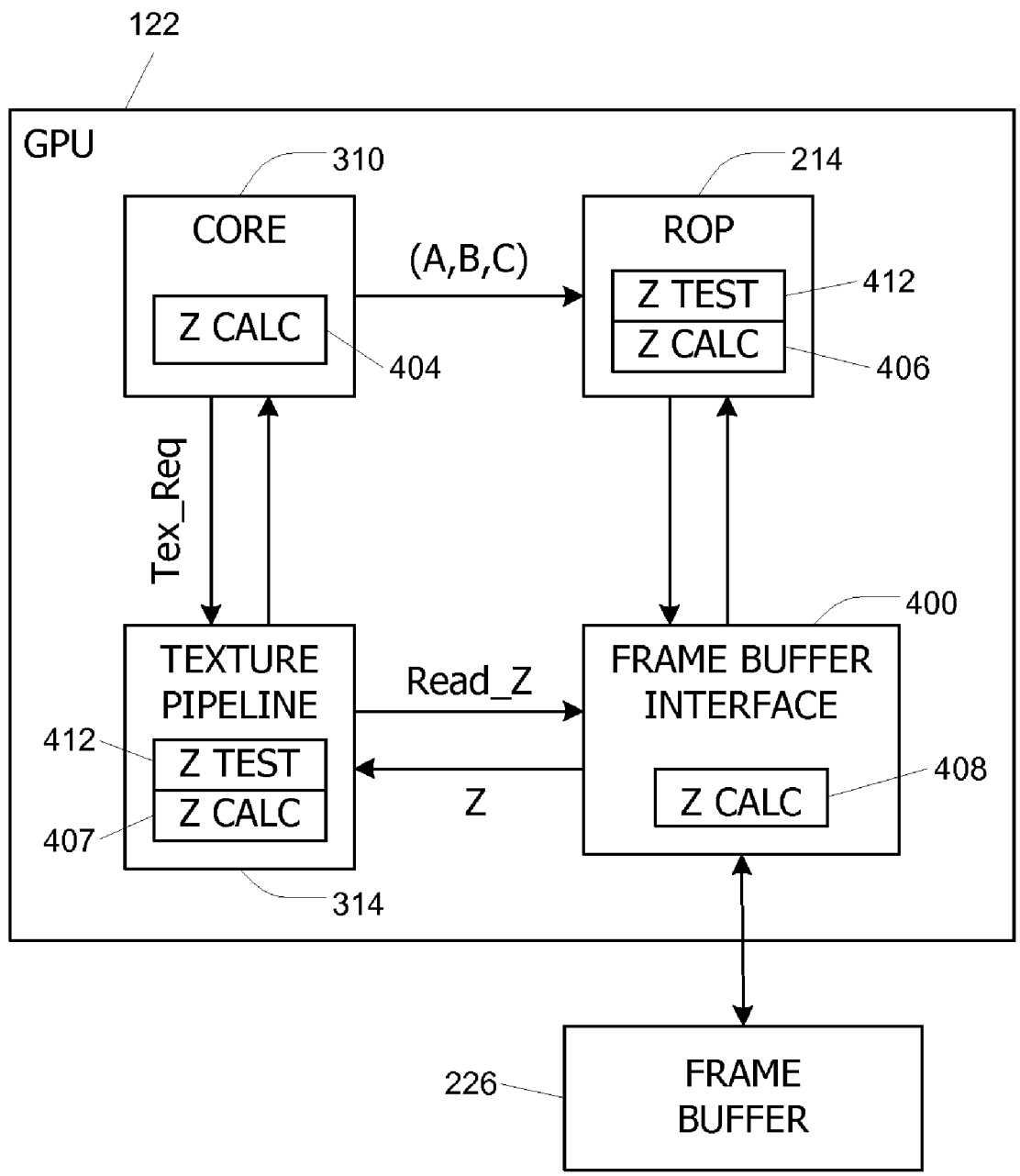
FIG. 4 is a block diagram of a graphics processor that illustrates sharing of planar Z information and Z coordinates among different processing sections according to an embodiment of the present invention.

FIG. 4 is a block diagram of GPU 122 that illustrates sharing of planar Z information and Z coordinates among different processing sections of GPU 122 according to an embodiment of the present invention.

As shown in FIG. 4, GPU 122 has a number of different processing sections, such as a core 310, a texture pipeline 314, a ROP unit 214, and a frame buffer interface 400. Each processing section is advantageously usable to perform a particular portion of a rendering operation. For instance, core 310 is usable to perform pixel shader operations (e.g., executing a pixel shader program). Texture pipeline 314 is usable to perform texture filtering during the course of pixel shading as described above. ROP unit 214 is usable to integrate new fragments produced by core 310 into an image being rendered into frame buffer 226. Frame buffer interface 226 communicates with ROP unit 214 to load the image into frame buffer 226 and also communicates with texture pipeline 314 to provide texture data that may be stored in frame buffer 226 or other memory.

Any of these (or other) processing sections may include arithmetic circuits configured to compute Z coordinates for various fragments from planar Z representations and/or logic circuits configured to compare two (or more) Z coordinates for use in various rendering decisions. In one embodiment, core 310, ROP unit 214, texture pipeline 314, and frame buffer interface 400 include respective "Z calc" circuits 404, 406, 407, 408 that compute a Z coordinate for a pixel (or sample) by interpolation from a planar Z representation. Texture pipeline 314 and ROP unit 214 include respective "Z test" circuits 410, 412 that compare two Z coordinates. It is to be understood that a GPU may include any number of instances of each of the modules shown in FIG. 4, and each instance may include one or more copies of a Z test and/or Z calc circuit.

As described above with reference to FIG. 3A, core 310 may compute Z coordinates for individual pixels (or samples) from a planar Z representation during execution of a pixel shader program. In the embodiment of FIG. 4, core 310 computes Z coordinates using Z calc circuit 404, which may be implemented in a multipurpose arithmetic functional unit capable of performing planar interpolation operations as well as other operations. An example of such a functional unit is described in above-referenced application Ser. No. 10/970, 101.

In this embodiment, core 310 provides Z information to ROP unit 214 using the planar Z representation. ROP unit 214 includes a Z calc circuit 406 that computes Z values for source fragments (i.e., fragments received from core 310) and destination fragments (i.e., fragments retrieved from frame buffer 226) as needed for use by Z test circuit 412. In some embodiments, ROP unit 214 advantageously includes two copies of Z calc circuit 406 so that source and destination Z coordinates may be computed in parallel. For instance, if ROP unit 214 includes Z operations unit 350 of FIG. 3B, source Z evaluation unit 364 and destination Z evaluation unit 366 may each include a copy of Z calc circuit 406.

ROP unit 214 advantageously writes "compressed" Z data for a tile to frame buffer 226 using the planar Z representation, as described above and in above-referenced application Ser. No. 10/878,460. As described above, in one embodiment, a planar Z representation can be used to represent up to a maximum number (e.g., six) of surfaces that are each visible in at least part of the tile. Where more than the maximum number of surfaces are visible in a tile, "uncompressed" Z data—i.e., a Z coordinate for each pixel in the tile—is stored instead. If uncompressed Z data is to be stored for a tile, ROP unit 214 advantageously computes the Z coordinates and writes them to frame buffer 226. A compression flag can be associated with each tile in frame buffer 226 and used to indicate whether the stored Z data for that tile is compressed or uncompressed.

Frame buffer interface 400 manages all interactions with frame buffer 226, including reading and writing of Z data. Frame buffer interface 400 is advantageously able to supply Z data to a requesting client in either compressed or uncompressed form, depending on the form in which the requested information is stored, the nature of the requesting client, and/or the parameters of the request. In one embodiment, if the Z data for a particular tile is stored in uncompressed form, frame buffer interface 400 provides the uncompressed Z data to all requesters; if the Z data is in compressed form, frame buffer interface 400 determines whether to supply compressed or uncompressed Z data.

In some embodiments, the determination depends on the identity of the requesting client. For instance, ROP unit 214 in one embodiment has a Z calc circuit 406; to save bandwidth, frame buffer interface 400 advantageously provides compressed Z data to ROP unit 214. Texture pipeline 314 in the embodiment of FIG. 4 has a Z calc circuit; frame buffer interface 400 may provide compressed Z data. Alternatively, texture pipeline 314 might not include a Z calc circuit, and frame buffer interface 400 may decompresses the compressed Z data using its own Z calc circuit 408 and deliver the resulting per-pixel Z coordinate(s) to texture pipeline 314.

In some embodiments, clients external to GPU 122 (e.g., CPU 102 of FIG. 1) may also request Z data from frame buffer 226. Where such requests are handled by frame buffer interface 400, frame buffer interface 400 advantageously converts the planar Z data to Z coordinates and supplies the Z coordinates to the requesting client. Computing the Z coordinates within GPU 122 when servicing requests from an external client can be useful, e.g., for ensuring that consistent Z values are used throughout a system of which GPU 122 is a part, such as system 100 of FIG. 1.

In other embodiments, a client may explicitly request compressed or uncompressed Z data, e.g., by including a "Z compression" parameter in the request. Frame buffer interface 400 reads the Z compression parameter. If uncompressed information is requested for a tile for which compressed Z information is stored, frame buffer interface 400 uses Z calc circuit 408 to compute per-pixel Z coordinates to be returned to the requesting client.

Because different components of GPU 122 may compute Z coordinates, it is possible that components of GPU 122 may end up using Z coordinates computed by two or more different Z calc circuits. For instance, although texture pipeline 314 in this embodiment does not compute Z coordinates from planar representations, it may perform Z tests using a Z test circuit 412. In one embodiment, texture pipeline 314 compares the respective Z coordinates of a first pixel provided by core 310 and a second pixel retrieved from frame buffer 226 by frame buffer interface 400. In this example, the Z coordinate of the first pixel is computed by core 310 using Z calc circuit 404, while the Z coordinate of the second pixel is computed by frame buffer interface 400 using Z calc circuit 408. It should also be noted that in cases where frame buffer 226 stores uncompressed Z data for a tile, the Z coordinate for the second pixel might have been computed by Z calc circuit 406 in ROP unit 214.

Thus, texture pipeline 314 may compare Z coordinates computed by different Z calc circuits in different units of GPU 122. For instance, a Z coordinate computed by Z calc circuit 404 in core 310 might be compared to a Z coordinate computed either by Z calc circuit 406 in ROP unit 214 or by Z calc circuit 408 in frame buffer interface 400. One example occurs in the context of "depth peeling," a widely-used algorithm that renders transparency by sorting depth layers from front to back and successively compositing fragments at different depths. In one implementation of depth peeling, texture pipeline 314 performs the sorting by comparing a Z coordinate computed for the current layer by Z calc circuit 404 in core 310 to a previous Z value stored in a depth buffer (e.g., within frame buffer 226). If the depth buffer stores compressed Z data, texture pipeline 314 computes the previous Z value. To the extent that core 310 and texture pipeline 314 do not compute Z values consistently, visual artifacts (e.g., small holes or gaps in surfaces that should appear continuous) may appear in the rendered image.

To ensure that the result of the comparison is independent of which Z calc circuit computed a particular Z coordinate, it is desirable to ensure that Z calc circuits 404, 406 and 408 are all bit-identical to each other. As used herein, two calculation circuits are "bit-identical" if, for any input planar Z representation and coordinates, the output Z coordinates produced by the circuits are identical to each other. Having bit-identical Z calc circuits in texture pipeline 314 and core 310, for instance, allows depth peeling to operate correctly.

In some embodiments, bit-identical Z calc circuits are provided by using the same arrangement of arithmetic circuits (multipliers, adders, etc.) of like design in each Z calc circuit. It is to be understood that calculation circuits may be bit-identical, in the sense used herein, even if they differ in the arrangement of components and/or in the presence or absence of various components that do not affect the output of the Z calculation.

For instance, Z calc circuit 404 of core 310 can be implemented using a multipurpose arithmetic functional unit of the kind described in above-referenced application Ser. No. 10/970,101. In this embodiment, the functional unit includes an arrangement of multipliers, shifters, inverters and adders that are used to perform planar interpolation operations, along with other components (e.g., multiplexers, lookup tables, etc.) that allow the functional unit to be reconfigured to perform other operations, as described in above-referenced application Ser. No. 10/970,101. In one embodiment of the present invention, any components of one Z calc circuit (e.g., circuit 404 of core 310) that do not affect the result of a planar interpolation operation need not be replicated in other Z calc circuits (e.g., circuit 406 in ROP unit 214 or circuit 408 in frame buffer interface 400).

Example of Z Calc Circuit

Figure 5:
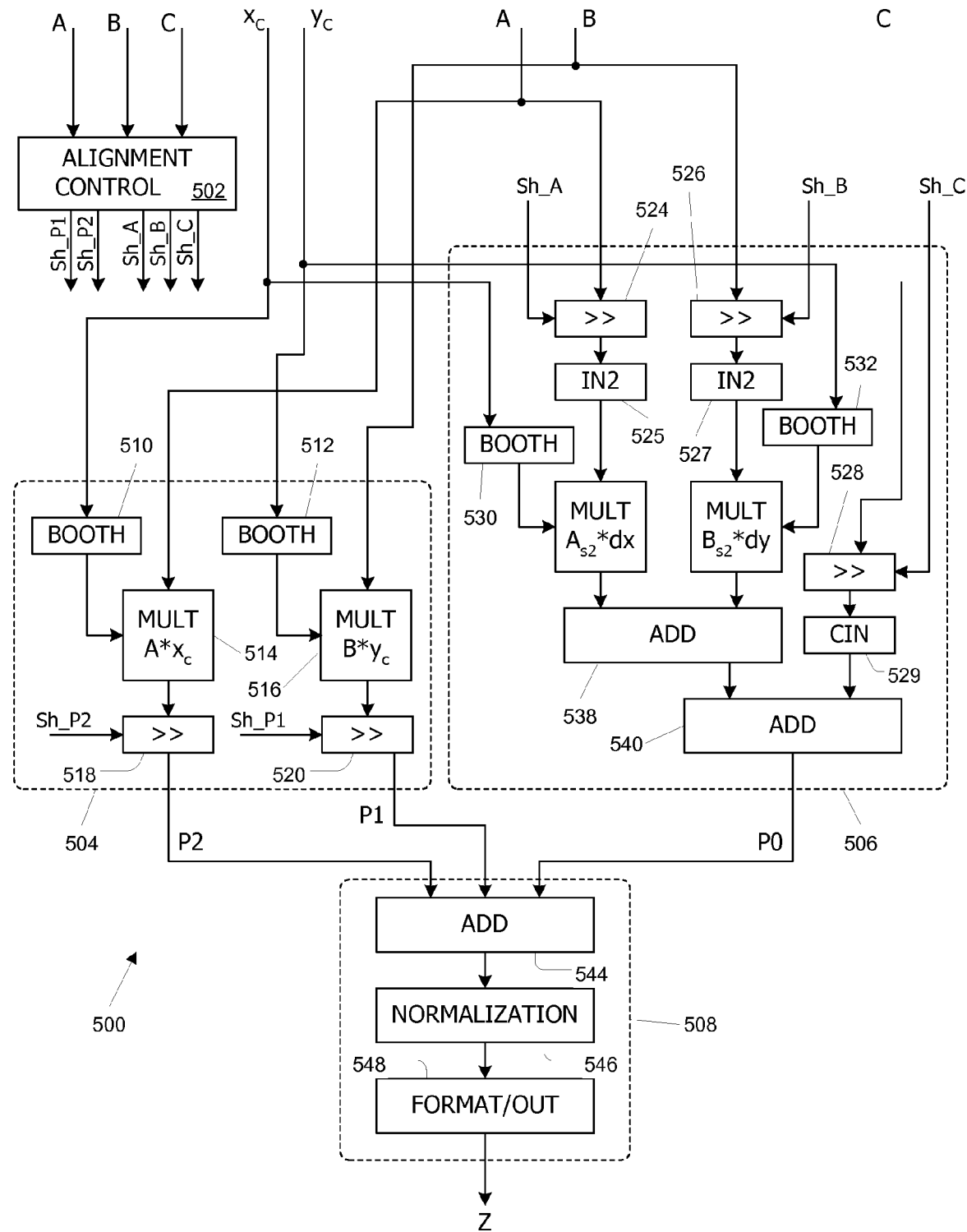
FIG. 5 is a block diagram of an arithmetic circuit that computes Z coordinates from a planar Z representation according to an embodiment of the present invention.

FIG. 5 is a block diagram of an arithmetic circuit 500 that computes Z coordinates according to an embodiment of the present invention. Circuit 500, which may be implemented in any or all of Z calc circuits 404, 406, 408 of FIG. 4, can compute Z coordinates using screen-space coefficients A, B, C, or tile-relative plane coefficients $A_t$, $B_t$, $C_t$ as desired.

Circuit 500 includes an alignment control block 502, a product section 504 that computes products P2=A*$X_c$ and P1=B*$Y_c$, an offset section 506 that computes an offset P0=A*dx+B*dy+C, and a sum section 508 that adds the products P2 and P1 produced by product section 504 and offset P0 computed by offset section 506 to produce the final result.

Circuit 500 receives parameters A, B, C (or $A_t$, $B_t$, $C_t$ if the planar Z representation uses tile-relative coordinates), coordinates of a reference point ($X_c$, $Y_c$), and an offset (dx, dy) relative to the reference point ($X_c$, $Y_c$). In one embodiment where the planar Z representation uses tile-relative coordinates, the reference point coordinates may be (0, 0), and the offset (dx, dy) may be the tile-relative coordinates (x, y) of the pixel (or sample) for which a Z coordinate is to be computed. In other embodiments, the reference point might be the center of a tile in screen-space coordinates while the offsets identify the centers of pixels relative to the tile center, or the reference point might be the center of a pixel (in screen-space or tile-relative coordinates, depending on the Z representation) while the offsets identify sample locations within the pixel relative to the pixel center.

In one embodiment, parameters A, B, C are in a 32-bit floating-point format (e.g., the IEEE standard 32-bit floating-point format, referred to herein as "fp32"), while the reference point and offset coordinates are in a fixed-point format. In one embodiment, the reference point coordinates ($X_c$, $Y_c$) are in a signed 13-bit format while the offsets (dx, dy) are in either an unsigned 4-bit format or a signed 5-bit format.

Alignment control circuit 502 determines shift amounts for products P1 and P2, as well as for parameters A, B and C, and generates appropriate Sh_P1, Sh_P2, Sh_A, Sh_B, and Sh_C signals. Alignment control circuit 502 also advantageously determines a block exponent (not explicitly shown in FIG. 5) for the final result. Where $X_c$, $Y_c$, dx and dy are fixed-point numbers while A, B and C are floating-point numbers, the shift amounts and block exponent will depend only on the respective exponents of A, B and C. Thus, in some embodiments, some or all of these shift signals may be determined earlier (e.g., at the time A, B and C are computed) and provided to circuit 500 along with parameters A, B, and C. These shift signals are used to align the various products prior to addition as described below. Conventional techniques for determining alignment shifts and block exponents may be used.

Product section 504 includes Booth encoders 510, 512, multiplier trees 514, 516 and shift circuits 518, 520, which may be of generally conventional design. In one embodiment, Booth encoders 510, 512 implement the well-known Booth2, radix-4 encoding, while multipliers 514, 516 are 24×13-bit multiplier trees that each include a set of nine 25-bit Booth multiplexers, followed by a suitable carry-save adder (CSA) tree, such as three 27-bit 3:2 CSAs, followed by two 29-bit 3:2 CSAs, followed by one 35-bit 4:2 CSA. Multipliers 514, 516 may provide products in redundant (carry-save) form, or they may each include a final carry-propagation adder (CPA) to convert the product to non-redundant form.

In operation, Booth encoders 510 and 512 Booth-encode reference coordinates $X_c$ and $Y_c$, respectively and provide the Booth-encoded operands as multipliers to multiplier trees 514 and 516. Plane equation coefficients A and B are provided as multiplicands to multiplier trees 514 and 516, respectively. Thus, multiplier tree 514 computes a product A*$X_c$ while multiplier tree 516 computes a product B*$Y_c$. In one embodiment, multiplier trees 514 and 516 use the sign bits of A and B, respectively, to invert the signs of the Booth partial products if A or B is a negative number.

Shift circuits 518 and 520 apply the appropriate shifts, determined by signals Sh_P1 and Sh_P2, in order to properly align these products before they are added in sum section 508. In one embodiment, multiplier trees 514 and 516 provide their outputs in redundant (carry-save) form, and shift circuits 518 and 520 operate on the redundant-form results, as described in above-referenced application Ser. No. 10/970, 101. In another embodiment, multipliers 514 and 516 provide their outputs in non-redundant form, and shift circuits 518 and 520 sign-extend the shifted results P2 and P1.

Where the planar Z representation uses tile-relative coefficients $A_t$, $B_t$, $C_t$, product section 504 may use $X_c$=0 and $Y_c$=0 to generate P2=0 and P1=0.

Offset section 506 includes shift circuits 524, 526, 528; two's complement inverters (IN2) 525, 527; conditional inverter (CIN) 529; Booth encoders 530, 532; multiplier trees 534, 536; and adders 538, 540, which may be of generally conventional design.

In operation, shift circuits 524 and 526 apply appropriate shifts, determined by signals Sh_A and Sh_B, respectively, to the plane coefficients A and B, to support correct addition later in the circuit. Inverters 525, 527 perform two's-complement inversion on shifted coefficients $A_{sh}$ and $B_{sh}$. If A (B) is less than zero, inverter 525 (527) provides the two's complement inverse of $A_{sh}$ ($B_{sh}$) as a multiplicand $A_{s2}$ ($B_{s2}$) to multiplier 534 (536); otherwise, multiplier $A_{s2}$ ($B_{s2}$) is just the shifted coefficient $A_{sh}(B_{sh})$. Booth encoders 530 and 532 encode offset coordinates dx and dy, respectively, e.g., using Booth2, radix-4 encoding, and provide the Booth encoded operands as multipliers to multiplier trees 534 and 536. Multiplier tree 534 computes a product $A_{s2}$*dx while multiplier tree 536 computes a product $B_{s2}$*dy. Multiplier trees 534 and 536 provide their respective products to an adder 538, which adds the two products. In one embodiment, multiplier trees 536 and 538 each provide products in redundant form, and adder 538 is a 4:2 CSA.

Shift circuit 528 applies an appropriate shift, determined by signal Sh_C, to the plane coefficient C, to support correct addition later in the circuit, producing a shifted coefficient $C_{sh}$. Conditional inverter 529 inverts $C_{sh}$ if C is less than zero; otherwise the addend $C_{s2}$ is just $C_{sh}$. Adder 540 (e.g., a 3:2 CSA) adds the sum produced by adder 538 to the addend $C_{sh}$ to produce offset P0.

Sum section 508 includes an addition unit 544, a normalization unit 546, and a formatting and output unit 548, which may be of generally conventional design. Addition unit 544 adds P2, P1 and P0 (which have already been properly aligned as described above). In one embodiment, P2, P1 and P0 are each in redundant form, and addition unit 544 includes a pair of 3:2 CSAs, followed by a 4:2 CSA that adds the output values from the 3:2 CSAs to produce a redundant-form result. A CPA can also be included in addition unit 544 to reduce the result to non-redundant form.

Normalization unit 546 normalizes the result (e.g., right-shifting a mantissa in the case of a carry-out during the addition operation or left-shifting the mantissa in the event of cancellation of MSBs that may occur when addition unit 544 adds P2, P1 and P0). Normalization unit 546 advantageously also modifies the block exponent to reflect the effect of any mantissa shift.

Formatting and output unit 548 formats the final result in accordance with a selected format and delivers the result (Z) at an output of circuit 500. In one embodiment, Z coordinates may be delivered either in fp32 format or in an unsigned normalized 24-bit fixed-point format (referred to herein as "unorm24"), in which fractional values in the range [0, 1] are represented using 24 bits. The format to be used for a particular application may be specified by the application program executing on CPU 102, as is known in the art. In this embodiment, formatting unit 548 advantageously is capable of converting a result to either fp32 or unorm24 format (or any other format allowable in a particular embodiment); a control signal received by formatting unit 548 may be used to select the format.

Referring again to FIG. 4, Z calc circuits 404, 406 and 408 may each be implemented as a copy of circuit 500 of FIG. 5. As long as each copy uses identical Booth encoders, multipliers, adders, and so on, each copy will produce identical output from identical input. Different Z calc circuits in the same GPU may differ in including or omitting various components (not shown in FIG. 5) that do not affect the result of a Z computation.

Figure 6:
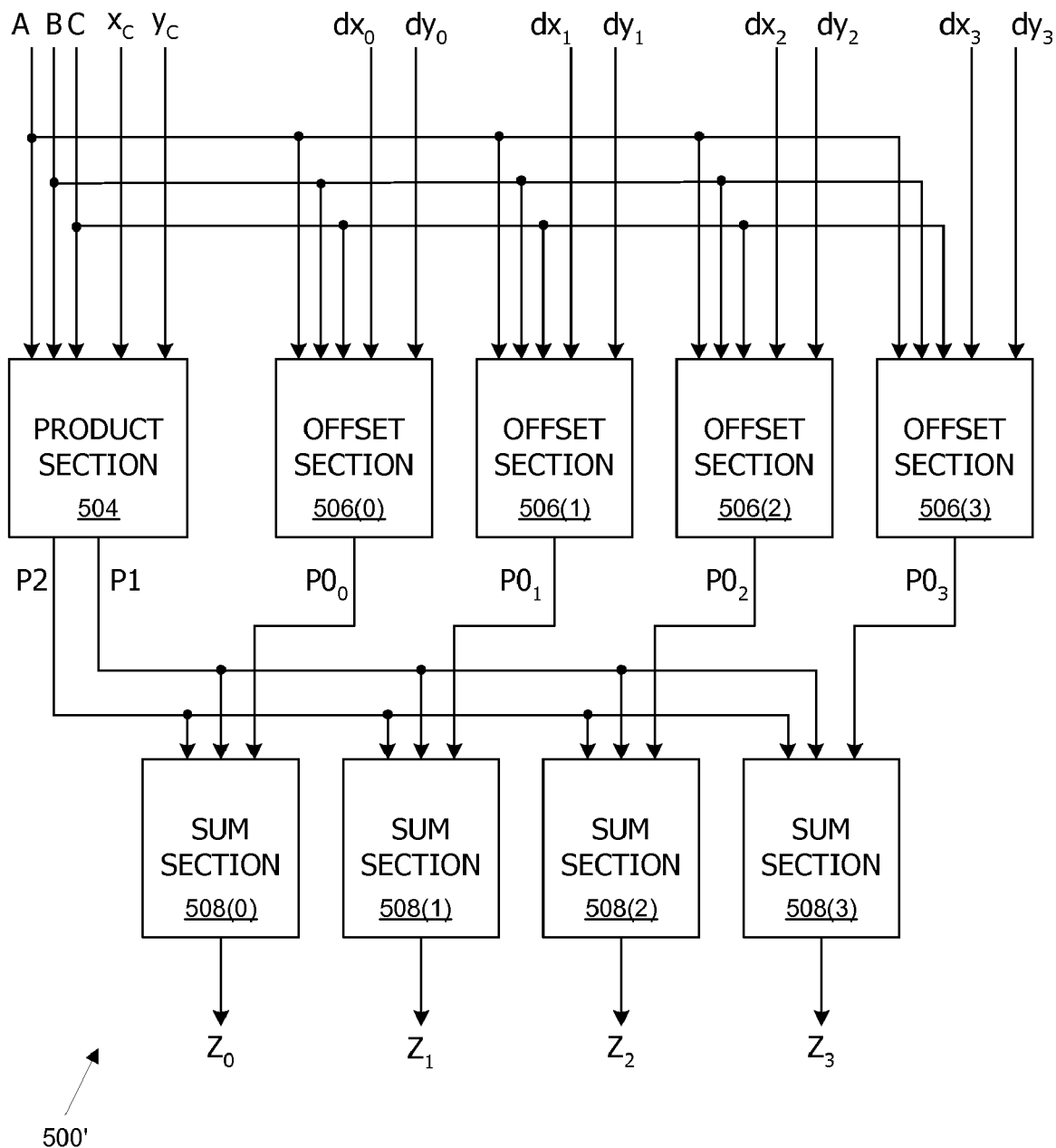
FIG. 6 is a block diagram of an alternative circuit that computes Z coordinates from a planar Z representation according to an embodiment of the present invention.

In some embodiments circuit 500 may be modified to compute Z coordinates for multiple locations in a tile in parallel by replicating offset section 506 and sum section 508 the desired number of times. An example is shown in FIG. 6, a block diagram of an alternative Z calc circuit 500' according to an embodiment of the present invention. Circuit 500' includes an alignment control block 502 (not explicitly shown in FIG. 6), a product section 504, four copies of offset section 506, and four copies of sum section 508. It is to be understood that each section of circuit 500' may include multipliers, adders and the like identical to those shown explicitly in FIG. 5. Product section 504 receives reference-point coordinates ($X_c, Y_c$) and planar Z coefficients A, B, C and computes products P2 and P1 as described above. Each copy of offset section 506 receives a different set of offset coordinates ($dx_i, dy_i$) (where i=0, 1, 2, 3) and the same planar Z coefficients A, B, C; each offset section computes a different offset $P0_i$. Each copy of sum section 508 receives products P2 and P1 and a different one of the offsets $P0_i$ and adds the received values to determine a Z coordinate $Z_i$.

It will be appreciated that the Z calculation circuits described herein are illustrative and that variations and modifications are possible. The particular configuration of multipliers and adders shown herein may be modified as desired. A Z calc circuit may include any number of copies of the offset section and product section. Further, Z calc circuits in different units within a GPU may include different numbers of such copies, depending on the optimum degree of parallelism for that circuit. For instance, referring to FIG. 4, a Z calc 404 unit in core 310 may include four copies of offset section 506 and sum section 508 as shown in FIG. 5, while ROP 314 includes two Z calc circuits, each of which has two copies of offset section 506 and sum section 508.

It should also be noted that where $X_c$ and $Y_c$ are always zero, as is the case in some embodiments where the planar Z representation is always in tile-relative coordinates, offset section 506 could be used, with appropriate normalization and formatting blocks, to compute Z without using product section 504 or adder 544 in sum section 508. Alternatively, a Z calculation circuit that computes only one Z coordinate at a time might be simplified relative to circuit 500 by omitting the multiplier trees and adders of offset section 504.

In one embodiment, Z calc unit 404 in core 310 is implemented as part of a multipurpose arithmetic functional unit as described in above-referenced application Ser. No. 10/970,101. The multiplier and adder sizes, shifter behavior and the like adopted for Z calc unit 404 can be duplicated in other Z calc units (e.g., Z calc units 406 and 408) in order to assure that all Z calc units produce identical results.

Consistent Formatting of Z Coordinates

Referring again to FIG. 4, persons having ordinary skill in the art with access to the present teachings will recognize that Z coordinates computed by different Z calc circuits might be in different formats. For instance, in one embodiment, Z calc circuit 404 in core 310 always computes Z coordinates in fp32 format while Z calc circuit 408 in frame buffer interface 400 and Z calc circuit 406 in ROP unit 214 each compute Z coordinates in the format specified by the application program (which might be, e.g., either fp32 or unorm24).

When Z coordinates that were generated by different Z calc circuits are to be compared (e.g., by Z test circuit 412 of texture pipeline 314), the coordinates should be in the same format. In one embodiment where core 310 always provides Z coordinates in fp32 format, texture pipeline 314 converts any Z coordinates received in unorm24 format to fp32 format. No loss of precision occurs during this conversion, as the mantissa size of an fp32 number happens to be 24 bits.

In another embodiment, uncompressed Z data is stored in frame buffer 226 in a fixed-point format, e.g., unorm24 or unorm16, and Z calc circuit 406 in ROP unit 214 computes Z coordinates in fp32 format. ROP unit 214 may convert the fp32 computation result to the fixed-point format prior to making comparisons. It is to be understood that other conversions could also be used.

Further Embodiments

While the invention has been described with respect to specific embodiments, one skilled in the art will recognize that numerous modifications are possible. For instance, although particular formats such as fp32 and unorm24 have been used herein for illustration, any other format or combination of formats could be substituted without departing from the scope of the invention.

The planar Z representations used herein as an example of compressed Z data are also illustrative, and other representations of a surface fragment may be substituted. Planar Z representations may be defined using any point in screen coordinate space as a reference point; in some embodiments, planar Z representations for different surfaces may use different reference points, and the stored information for a planar Z representation may include reference point coordinates. In some embodiments, a non-linear or non-planar Z representation might be used; such representations have been proposed, e.g., to equalize sampling density for shadow depth maps.

Z comparison or Z test operations described herein are not limited to particular Z rules, and results of such a comparison or test may be used in any manner desired.

Further, while particular units within a graphics processor have been identified as including circuits that compute Z coordinates, it is to be understood that any or all units in a graphics processor may be provided with Z calculation circuits as described herein. In some embodiments, all Z calculation circuits across the entire processor are bit-identical, but this is not required; in other embodiments, all Z calculation circuits whose results might be shared with another unit or compared to Z coordinates provided by another unit are bit-identical, while other Z calculation circuits whose results are only used within a single unit (and are not compared to results produced by another unit) might diverge from the rest. In some instances, using non-bit-identical Z values that are never compared might result in certain anomalies, e.g., in results of depth tests performed in different stages of the rendering pipeline.

In some embodiments, a graphics processing system may include two or more graphics processors that cooperate to render images. In such systems, each processor may include one or more processing sections with arithmetic circuits that compute Z coordinates. The arithmetic circuits in different processors are advantageously made bit-identical so that the rendered image does not depend on which graphics processor performed a particular rendering operation.

Thus, although the invention has been described with respect to specific embodiments, it will be appreciated that the invention is intended to cover all modifications and equivalents within the scope of the following claims.

What is claimed is:

1. A graphics processor comprising:
a plane equation module to receive vertex information for a plurality of primitives, each primitive covering one or more of a plurality of tiles, and to generate a compressed Z representation corresponding to each primitive, each compressed Z representation being associated with at least one tile covered by the corresponding primitive;
a first processing section subsequent to the plane equation module, the first processing section including a first arithmetic circuit to compute a first Z coordinate for a sample location within a first tile from a first compressed Z representation associated with the first tile;
a second processing section subsequent to the plane equation module, the second processing section including a second arithmetic circuit to compute a second Z coordinate for a sample location within the first tile from a second compressed Z representation associated with the first tile; and
a third processing section subsequent to the plane equation module, the third processing section to receive the first Z coordinate from the first processing section and the second Z coordinate from the second processing section and to compare the first Z coordinate and the second Z coordinate,
wherein the first arithmetic circuit and the second arithmetic circuit are bit-identical to each other.

2. The graphics processor of claim 1 wherein the compressed Z representation is a planar Z representation.

3. The graphics processor of claim 1 wherein the first processing section is a processing core to execute a pixel shader and the second processing section is a raster operations unit.

4. The graphics processor of claim 1 wherein the first processing section is a raster operations unit and the second processing section is a frame buffer interface.

5. The graphics processor of claim 1 wherein the first processing section is a processing core to execute a pixel shader and the second processing section is a texture processing unit.

6. The graphics processor of claim 1 wherein the first processing section is a texture processing unit and the second processing section is a frame buffer interface.

7. The graphics processor of claim 2 wherein the planar Z representation includes coefficients A, B, and C for a plane equation of the form $Z(x, y)=A*x+B*y+C$, where $(x, y)$ are screen coordinates of a sample in the tile.

8. The graphics processor of claim 7 wherein the plane equation module further determines at least the coefficient C as a tile-specific coefficient.

9. A method of rendering an image in a graphics processor, the method comprising:
generating a first compressed Z representation corresponding to a first one of a plurality of primitives, the first compressed Z representation being associated with a tile covered by the first primitive;
with a first processing section, computing a first Z coordinate for a sample location within the tile from the first compressed Z representation using a first arithmetic circuit in a first processing section of the graphics processor;
generating a second compressed Z representation corresponding to a second one of the plurality of primitives, the second compressed Z representation being associated with the tile;
with a second processing section, computing a second Z coordinate for the sample location within the first tile from the second compressed Z representation using a second arithmetic circuit in a second processing section of the graphics processor, the second arithmetic circuit being bit-identical to the first arithmetic circuit;
with a third processing section, comparing the first Z coordinate and the second Z coordinate; and
performing a rendering operation that depends at least in part on the result of comparing the first Z coordinate to the second Z coordinate.

10. The method of claim 9 wherein obtaining a compressed Z representation includes:

generating, based on the primitive, plane equation coefficients A, B, and C for a plane equation of the form $Z(x, y)=A*x+B*y+C$, where $(x, y)$ are screen coordinates of a sample in the tile, wherein the plane equation coefficients A, B, and C are included in the compressed Z representation.

11. The method of claim 10 wherein at least the coefficient C is determined as a tile-specific coefficient.

12. The method of claim 9 further comprising storing the first compressed Z representation in a frame buffer coupled to the graphics processor.

13. The method of claim 9 wherein the first processing section is a processing core to execute a pixel shader and the second processing section is a raster operations unit.

14. The method of claim 9 wherein the first processing section is a raster operations unit and the second processing section is a frame buffer interface.

15. The method of claim 9 wherein the first processing section is a processing core configured to execute a pixel shader and the second processing section is a texture processing unit.

16. The method of claim 9 wherein the first processing section is a texture processing unit and the second processing section is a frame buffer interface.

17. A graphics processor comprising:

a plane equation module to receive vertex information for a plurality of primitives, each primitive covering one or more of a plurality of tiles, and to generate a compressed Z representation corresponding to each primitive, each compressed Z representation being associated with at least one tile covered by the corresponding primitive;

a first processing section subsequent to the plane equation module, the first processing section including a first arithmetic circuit to compute a first Z coordinate for a sample location within a first tile from a first compressed Z representation associated with the first tile;

a second processing section subsequent to the plane equation module, the second processing section including a second arithmetic circuit to compute a second Z coordinate for a sample location within the first tile from a second compressed Z representation associated with the first tile; and a third processing section subsequent to the plane equation module, the third processing section to receive the first Z coordinate from the first processing section and the second Z coordinate from the second processing section and to compare the first Z coordinate and the second Z coordinate.

18. The graphics processor of claim 17 wherein the first arithmetic circuit and the second arithmetic circuit are bit-identical to each other.

19. The graphics processor of claim 17 wherein the compressed Z representation is a planar Z representation.

* * * * *

UNITED STATES PATENT AND TRADEMARK OFFICE
CERTIFICATE OF CORRECTION

PATENT NO. : 7,659,893 B1  
APPLICATION NO. : 11/538002  
DATED : February 9, 2010  
INVENTOR(S) : Oberman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 658 days.

Signed and Sealed this

Thirtieth Day of November, 2010

David J. Kappos  
*Director of the United States Patent and Trademark Office*